(12) United States Patent
Ying et al.

(10) Patent No.: US 7,136,802 B2
(45) Date of Patent: Nov. 14, 2006

(54) METHOD AND APPARATUS FOR DETECTING PROSODIC PHRASE BREAK IN A TEXT TO SPEECH (TTS) SYSTEM

(75) Inventors: Zhiwei Ying, Beijing (CN); Xiaohua Shi, Beijing (CN)

(73) Assignee: Intel Corporation, Santa Clara, CA (US)

( * ) Notice: Subject to any disclaimer, the term of this patent is extended or adjusted under 35 U.S.C. 154(b) by 923 days.

(21) Appl. No.: 10/052,147

(22) Filed: Jan. 16, 2002

(65) Prior Publication Data

US 2003/0135356 A1 Jul. 17, 2003

(51) Int. Cl.
*G08F 17/20* (2006.01)
(52) U.S. Cl. ............................ 704/1; 704/232; 704/256
(58) Field of Classification Search ........ 704/258–260, 704/9, 10, 232, 231, 236, 240, 242, 250, 704/251, 255, 256, 4
See application file for complete search history.

(56) References Cited

U.S. PATENT DOCUMENTS 5,479,563 A * 12/1995 Yamaguchi ................. 704/232
6,173,262 B1 * 1/2001 Hirschberg ................. 704/260
6,182,028 B1 * 1/2001 Karaali et al. .................. 704/9

OTHER PUBLICATIONS

Sanders et al., "Using Statistical Models to Predict Phrase Boundaries for Speech Synthesis", Nijmegen University, Netherlands, and Center for Speech Technology Research, University of Edinburgh, Edinburgh, U.K., pp. 4.
Chen et al., "An RNN-Based Prosodic Information Synthesizer for Mandarin Text-to-Speech", IEEE Transactions on Speech and Audio Processing, vol. 6, No. 3, May 1998, pp. 226-239.
Black et al., "Assigning Phrase Breaks from Part-of-Speech Sequences", Center for Speech Technology Research, University of Edinburgh, Edinburgh U.K., http://www.cstr.ed.ac.uk, pp. 4.

* cited by examiner

*Primary Examiner*—Richemond Dorvil
*Assistant Examiner*—Huyen X. Vo
(74) *Attorney, Agent, or Firm*—Blakely, Sokoloff, Taylor & Zafman LLP

(57) ABSTRACT

Methods for processing speech data are described herein. In one aspect of the invention, an exemplary method includes receiving a text sentence comprising a plurality of words, each of the plurality of words having a part of speech (POS) tag, generating a POS sequence based on the POS tag of each of the plurality of words, detecting a prosodic phrase break through a recurrent neural network (RNN), based on the POS sequence, and generating a prosodic phrases boundary based on the prosodic phrase break. Other methods and apparatuses are also described.

20 Claims, 12 Drawing Sheets

METHOD AND APPARATUS FOR DETECTING PROSODIC PHRASE BREAK IN A TEXT TO SPEECH (TTS) SYSTEM

FIELD OF THE INVENTION

The invention relates to speech recognition. More particularly, the invention relates to prosodic phrase break detection of a limited domain text to speech (TTS) application.

BACKGROUND OF THE INVENTION

In general, there are three key modules in a text to speech (TTS) system: the text analysis, the prosodic model and the speech synthesis. One of the important stages in the process of turning unmarked text into speech is the assignment of appropriate phrase break boundaries. The phrase break boundaries are important to later modules including accent assignment, duration control and pause insertion. A number of different algorithms have been proposed for such a task, ranging from the simple to the complex. These different algorithms require different information such as part of speech (POS) tags, syntax and even semantic understanding of the text. Obviously these requirements come at different costs and it is important to trade off difficulty in finding particular input features versus accuracy of the model.

Some of the languages, such as Chinese and Japanese, do not have space between the words. The first step of text analysis for such language processing is word segmentation. Because of the difficulty of syntactic parsing for these languages, most of the conventional TTS systems segment the words in the text analysis procedure, and limit the average length of the words after the segmentation at about 1.6 syllables, through the intrinsic properties of the words. Thus a small pause will be inserted every 1.6 syllables during the speech synthesis if there is no other higher level linguistic information, such as prosodic word, prosodic phrase and intonational phrase. As a result, the speech is not fluent enough. Native speakers tend to group words into phrases whose boundaries are marked by duration and intonational cues. Many phonological rules are constrained to operate only within such phrases, usually termed prosodic phrases. Prosodic phrase will help the TTS system produce more fluent speech, while the prosodic structure of the sentence will also help improve the intelligibility and naturalness of the speech. Therefore placing phrase boundaries is very important to ensure a naturally and sounding TTS system. With correct prosodic phrases detected from text, high quality prosodic model can be created and the acoustic parameters can be provided, which include pitch, energy, and duration, for the speech synthesis.

A lot of methods have been introduced to extract prosodic phrase boundaries from English text, such as statistic model, CART (Classification and Regression Tree), FSA (Finite State Automata), MM (Markov Model), and so on. Some approaches use the language information to parse the text, and then map from the syntactic structure to prosodic structure, some methods make use of POS to extract prosodic phrase from the text. However, these methods tend to have limited quality and complex procedures to accomplish their goals. It is desirable to have an improved method and system for detecting prosodic phrase break.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

Methods and apparatus' for prosodic phrase detection of a language are disclosed. The subject of the invention will be described with reference to numerous details set forth below, and the accompanying drawings will illustrate the invention. The following description is illustrative of the invention and is not to be construed as limiting the invention. Numerous specific details are described to derive a thorough understanding of present invention. However, in certain circumstances, well known, or conventional details are not described in order not to obscure the present invention in detail.

Reference throughout this specification to "one embodiment", "an embodiment", or "preferred embodiment" indicates that a particular feature, structure, or characteristic described in connection with the embodiment is included in at least one embodiment of the present invention. Thus, the appearance of the phrase "in one embodiment", "in an embodiment", or "in a preferred embodiment" in various places throughout the specification are not necessarily all referring to the same embodiment. Furthermore, the particular features, structures, or characteristic may be combined in any suitable manner in one or more embodiments.

Figure 1:
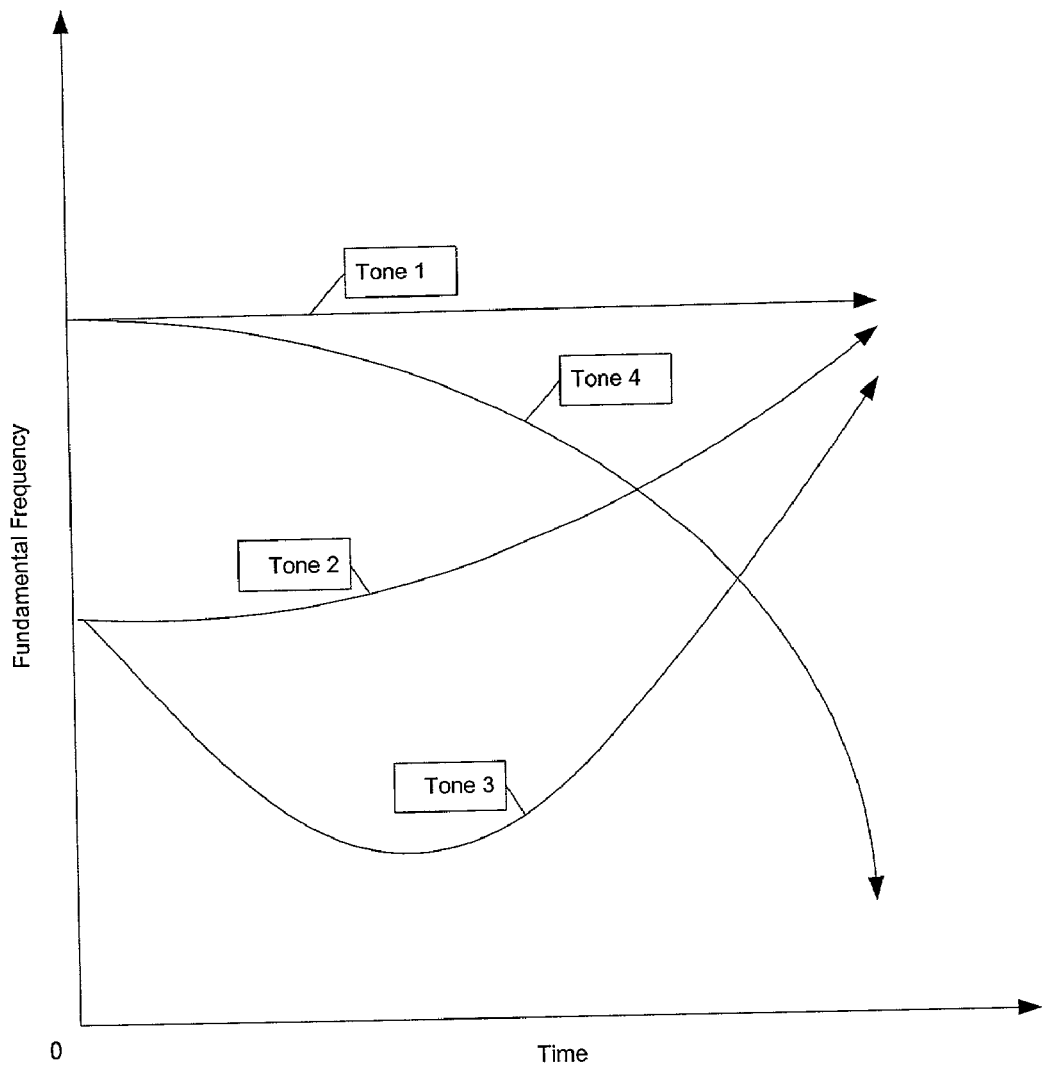
FIG. 1 shows a typical five main lexical tones used in Mandarin.

Unlike most European languages, some languages, such as Mandarin Chinese, use tones for lexical distinction. A tone occurs over the duration of a syllable. There are five main lexical tones that play very important roles in meaning disambiguation. FIG. 1 shows the typical five main lexical tones used in Mandarin. The direct acoustic representative of these tones is the pitch contour variation patterns, as illustrated in FIG. 1. In some cases, one word may have more than one meaning, when the word is associated with different lexical tone. As a result, there could be very large amount of meaning or voice outputs for every single word in Mandarin. Similarly, the voice outputs representing the number could be burdensome, in a text to speech (TTS) application. As the computer system is getting more popular, it is apparent to a person with ordinary skill in the art to use a computer system to implement such application.

Figure 2:
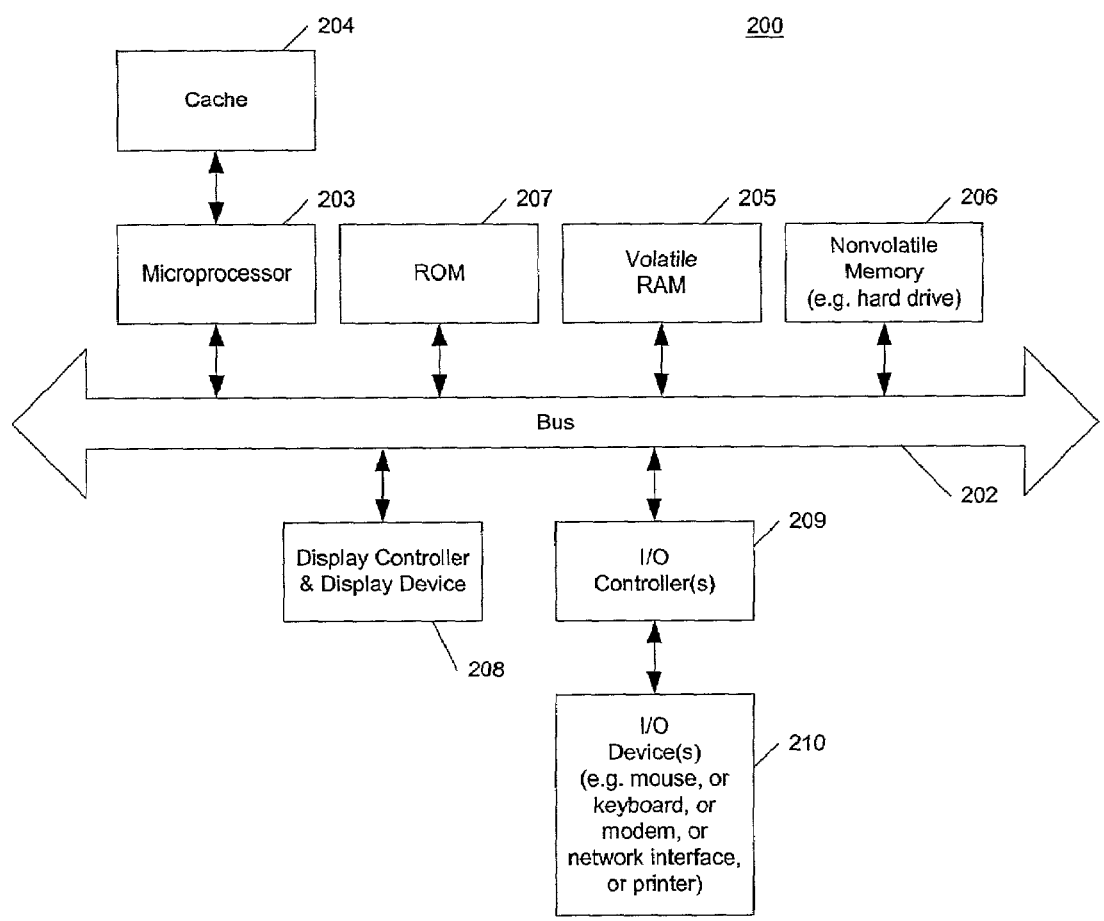
FIG. 2 shows a computer system which may be used according to one embodiment.

FIG. 2 shows one example of a typical computer system, which may be used with one embodiment of the invention. Note that while FIG. 2 illustrates various components of a computer system, it is not intended to represent any particular architecture or manner of interconnecting the components, as such details are not germane to the present invention. It will also be appreciated that network computers and other data processing systems which have fewer components or perhaps more components may also be used with the present invention. The computer system of FIG. 2 may, for example, be an Apple Macintosh or an IBM compatible computer.

As shown in FIG. 2, the computer system 200, which is a form of a data processing system, includes a bus 202 which is coupled to a microprocessor 203 and a ROM 207 and volatile RAM 205 and a non-volatile memory 206. The microprocessor 203 is coupled to cache memory 204 as shown in the example of FIG. 2. The bus 202 interconnects these various components together and also interconnects these components 203, 207, 205, and 206 to a display controller and display device 208 and to peripheral devices such as input/output (I/O) devices, which may be mice, keyboards, modems, network interfaces, printers and other devices which are well known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, a DVD RAM, or other type of memory system which maintains data even after power is removed from the system. Typically, the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

Figure 3:
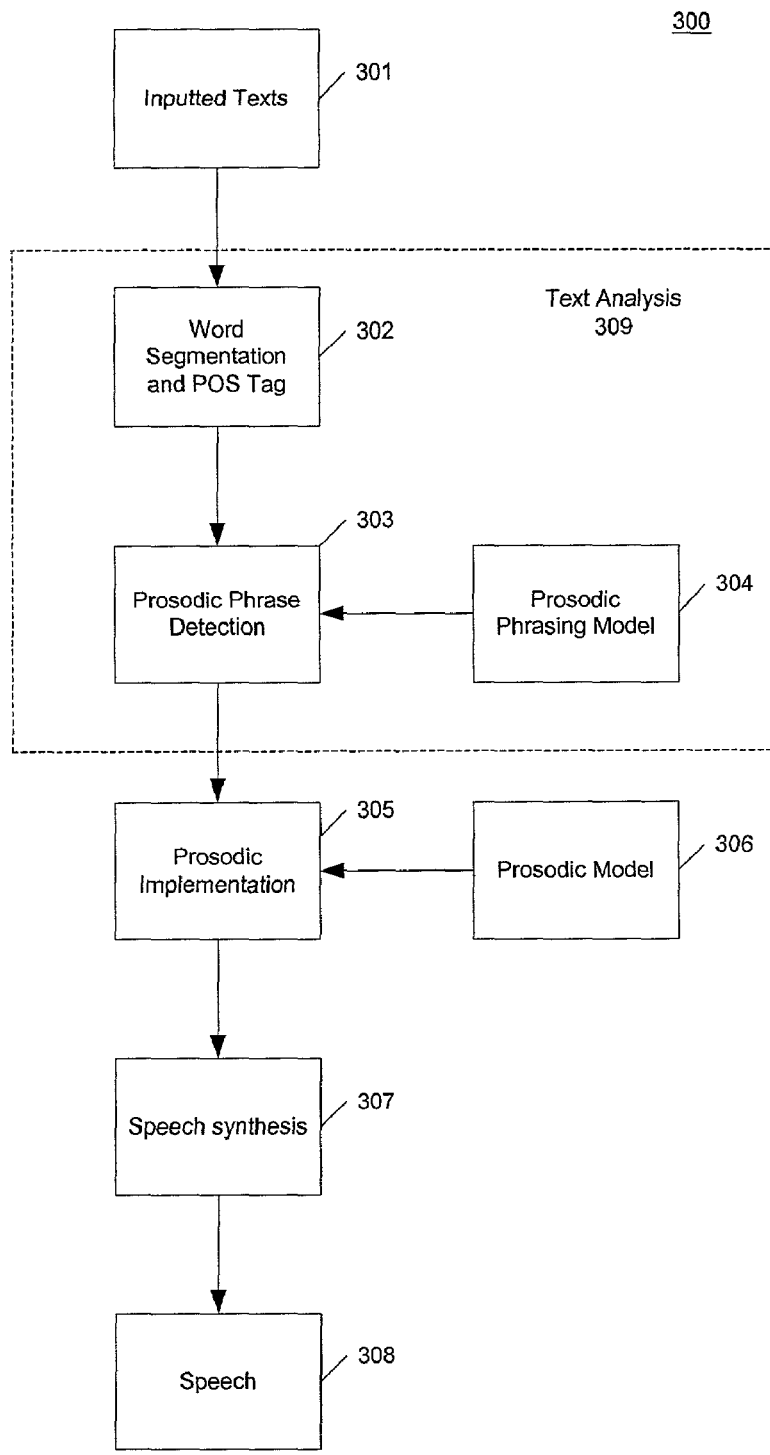
FIG. 3 shows a text to speech (TTS) system according to one embodiment.
Figure 4:
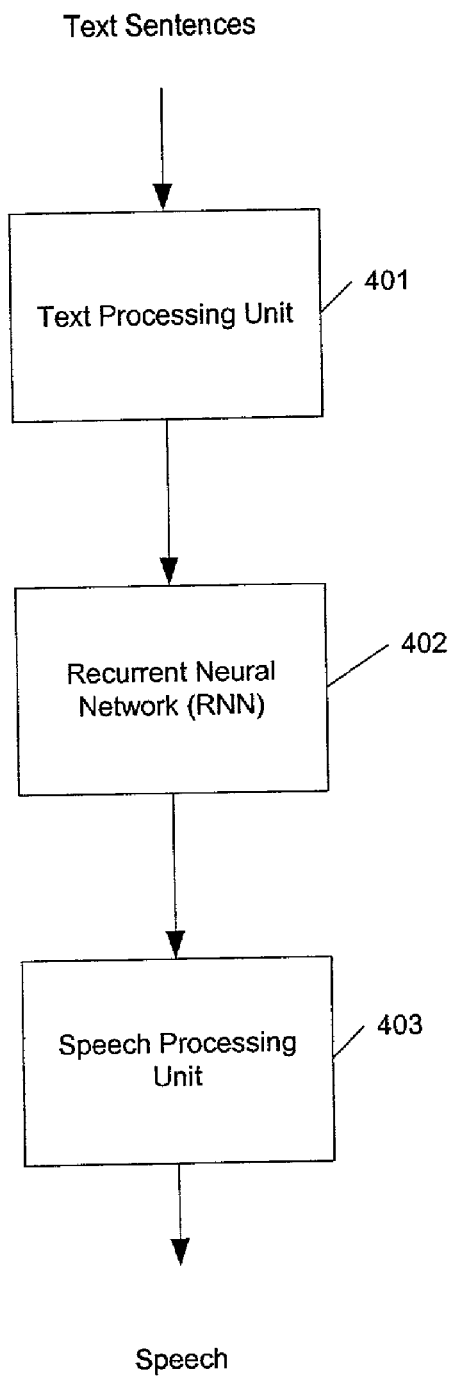
FIG. 4 shows an embodiment of prosodic phrase detection with a recurrent neural network (RNN).

FIG. 3 shows a block diagram of a text to speech (TTS) system. The system 300 receives the inputted texts 301 and performs text analysis 309 on the texts. During the text analysis 309, the words of the inputted text would be segmented 302 into a plurality of words. Each word would be assigned with a part of speech (POS) tag associated with the word. The POS tags are typically categorized into several classes. In one embodiment, the tag classification includes adjective, adverb, noun, verb, number, quantifier, preposition, conjunction, idiom, punctuation, and others. Additional classes may be utilized. Based on the POS tags of the words, the system performs prosodic phrase detection 303 using prosodic phrasing model 304. The prosodic phrase model 304 includes many factors, such as energy and duration information of the phrase. The system then utilizes the prosodic phrase break to apply in the prosodic implementation 305. During the prosodic implementation 305, the system may use the prosodic break to modify the syllables of the phrase and apply the prosodic model 306 which may includes pitch information of the phrase. As a result, a prosodic sentence with phrase break is created. The system next performs speech synthesis on the prosodic sentence with phrase break and generates a final voice output 308 (e.g., speech).

The present invention utilizes a recurrent neural network (RNN) to detect a prosodic phrase break. FIG. 3 shows an embodiment of a TTS system with an RNN. A text sentence is inputted to a text processing unit 401 for text analysis. During the text processing, the sentence may be segmented into a plurality of words. Then the text processing unit assigns a part of speech (POS) tag to each of the words. The tags of the words may be classified into a specific class as discussed above. As a result, a tag sequence corresponding to the words are generated. The tag sequence is then inputted to the recurrent neural network (RNN) 402. The RNN performs detection of a prosodic phrase break between each of the words. Each of the tags in the tag sequence is sequentially inputted to the RNN. For each inputted tag, a phrase break state is generated from the RNN. The outputted phrase breaks, as well as previously inputted tags are then fed back into the RNN to assist the subsequent prosodic phrase break detection of the subsequent tags of the tag sequence. As a result, a sentence with prosodic phrase break is created. Based on the phrase break detected, the speech features, such as duration, energy, and pitch may be modified. With the phrase break, the length of a word may be longer than a normal one. The sentence with prosodic break is then inputted into the speech processing unit 403 to perform speech synthesis. As a result, a speech (e.g., voice output) is generated through the speech processing unit 403.

Figure 5A:
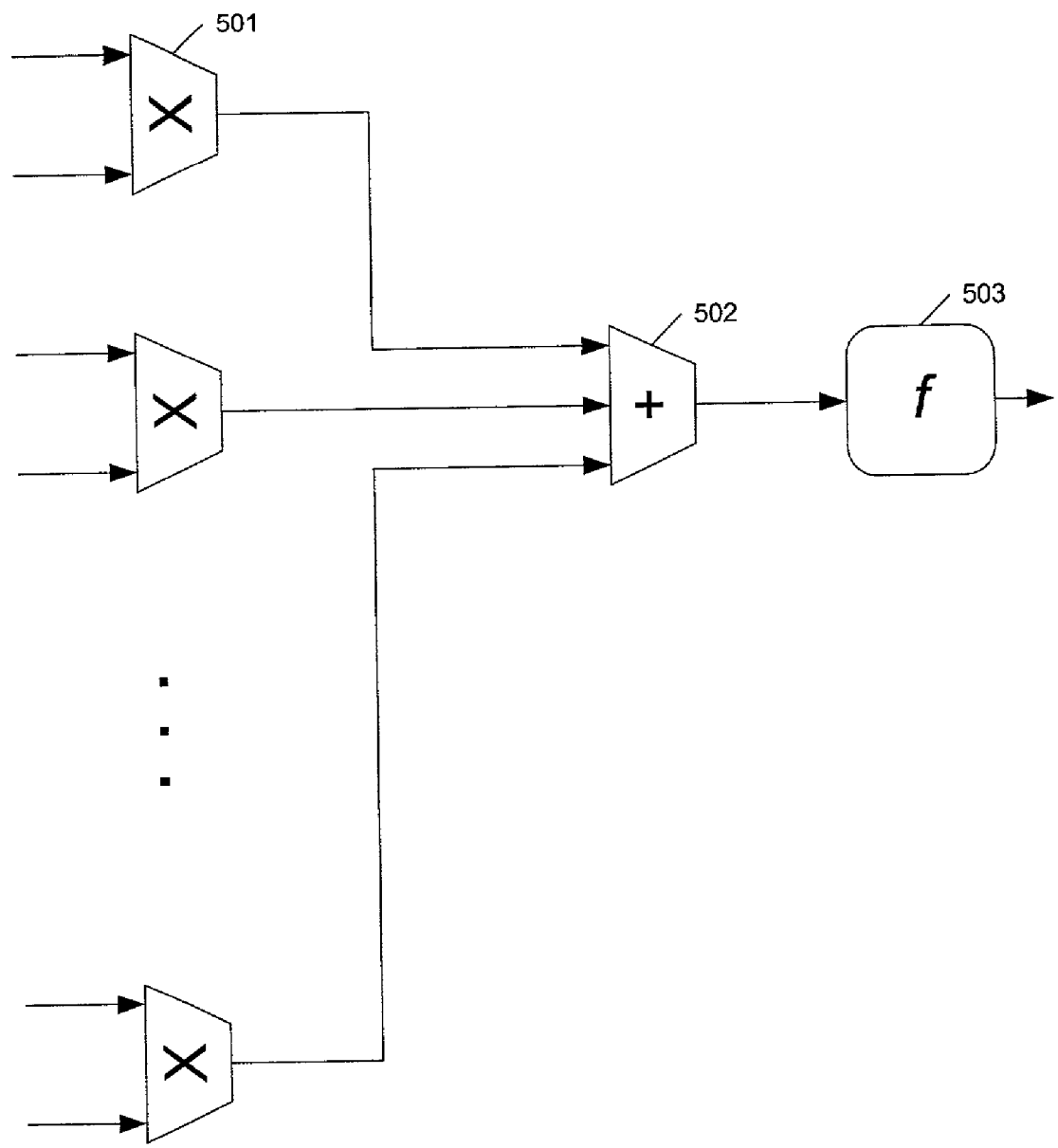
FIG. 5A shows a typical unit of an RNN.
Figure 5B:
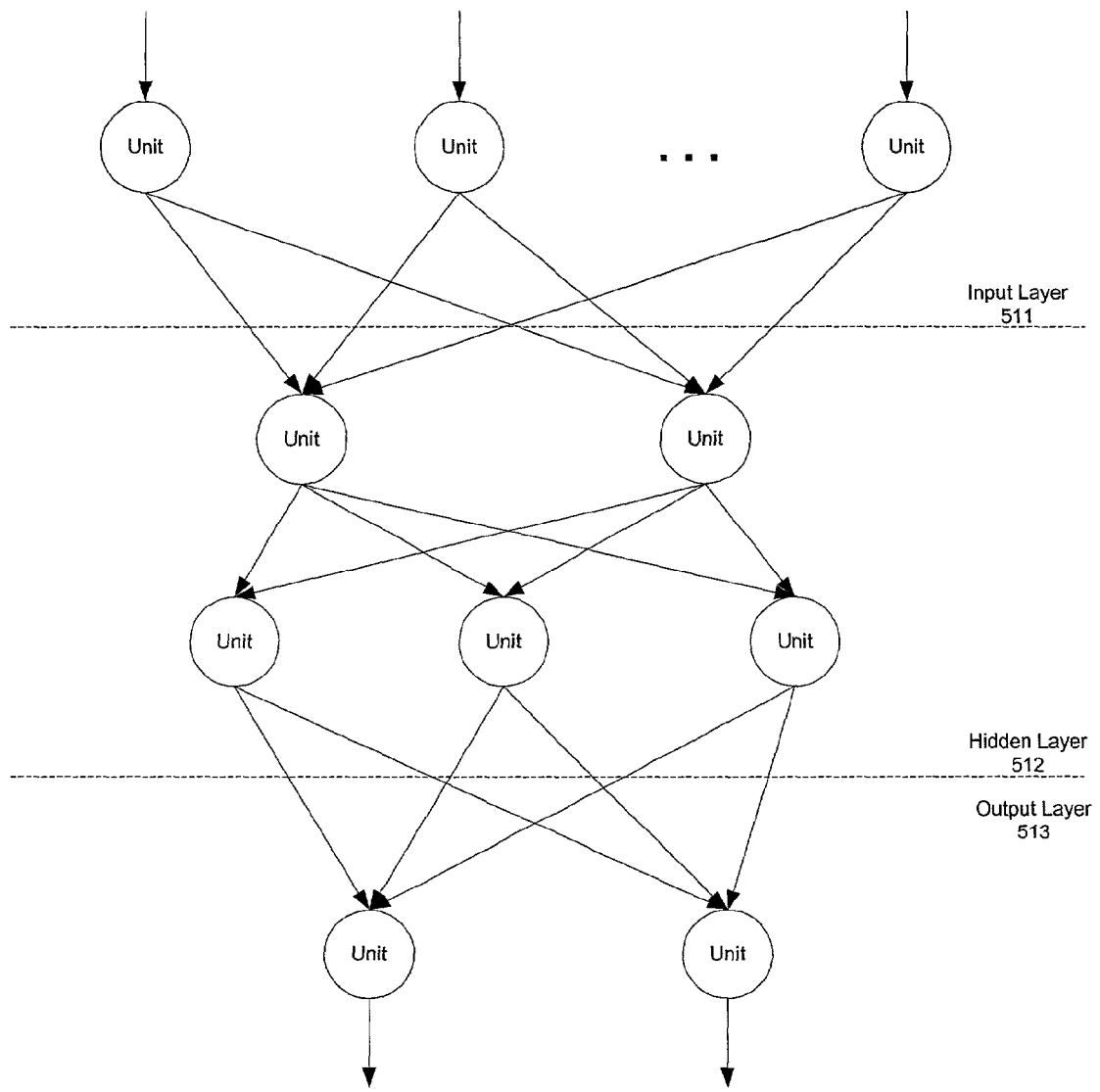
FIG. 5B shows a typical structure of an RNN.

In general, an RNN is used for analysis temporal classification problems. An RNN consists of a set of units, an example of which is shown in FIG. 5A. The unit has a weight associated with each unit. A function of the weights and inputs (e.g., a squashing function applied to the sum of the weight-input products) is then generated as an output. These individual units may be connected together as shown in FIG. 5B, with an input layer, output layer, and usually a hidden layer. Typically, the input layer consists of one unit per attribute, and the output layer of one unit per class. The number of the units in the hidden layer is normally arbitrary. Through algorithm such as back propagation, the weights of the neural net can be adjusted so as to produce an output on the appropriate unit when a particular pattern at the input is observed.

Figure 5C:
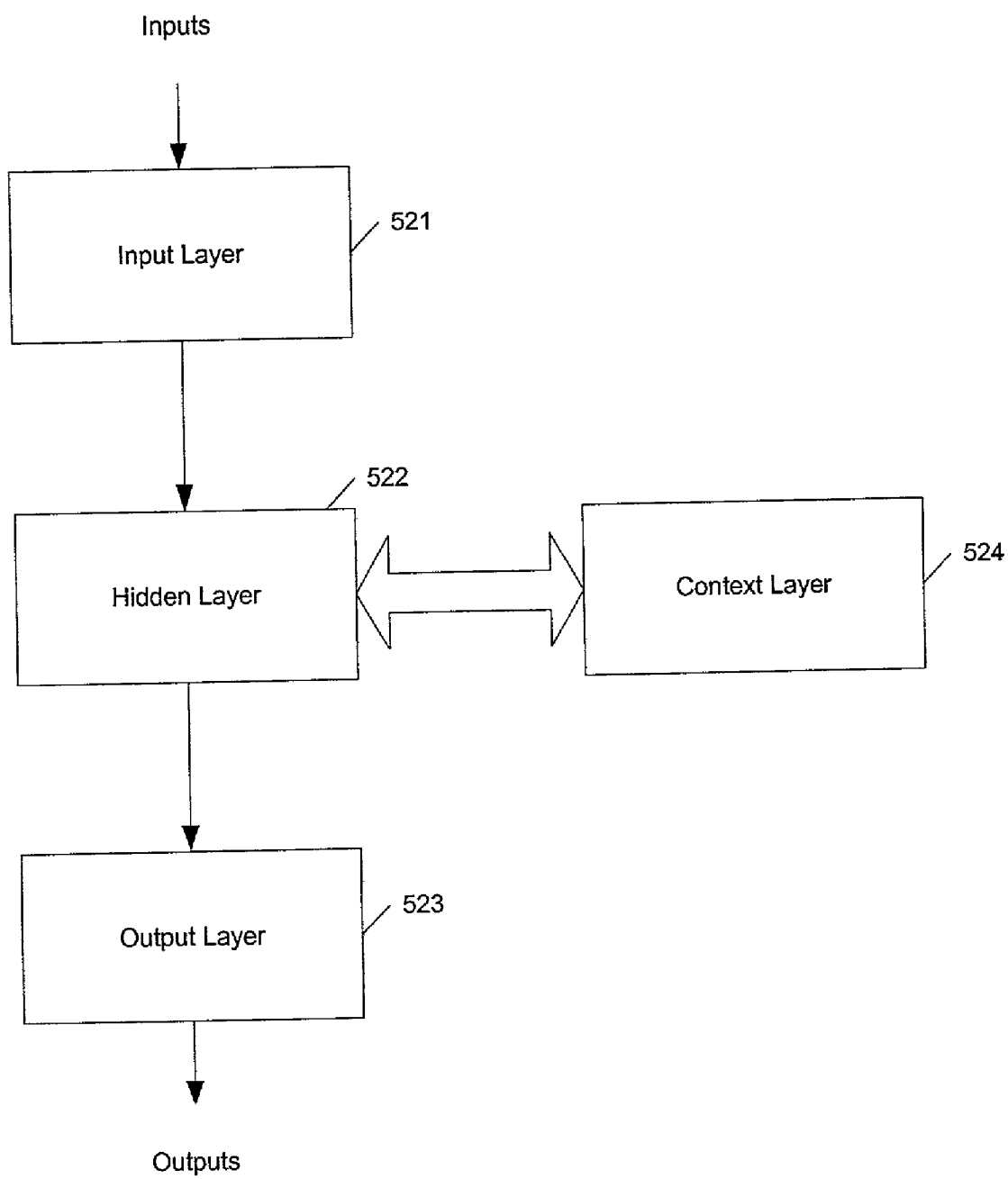
FIG. 5C shows an alternative structure of an RNN.

A recurrent neural network (RNN) allows for temporal classification, as shown in FIG. 5C. Referring to FIG. 5C, a context layer is added to the structure, which retains information between observations. At each time step, new inputs are fed into the RNN. The previous contents of the hidden layer are passed into the context layer. These contents then feed back into the hidden layer in the next time step. For a classification, post-processing of the outputs from the RNN is usually performed. For example, when a threshold on the output from one of the nodes is observed, that particular class has been observed.

Before an RNN can be used, it has to be trained. Training the recurrent network is the most computationally difficult process in the development of a system. Once each frame of the training data has been assigned a label, the RNN training is effectively decoupled form the system training. An objective function may be used to ensure that the network input-output mapping satisfies the desired probabilistic interpretation is specified. Training of the recurrent network is performed using gradient methods. Implementation of the gradient parameter search leads to two integral aspect of the RNN training: computation of the gradient and application of the gradient to update the parameters.

Typically, in a Chinese text to speech (TTS) system, there are approximately 2000 sentences (17897 words) in a corpus. The corpus is designed for general purpose, not limited to any specific domains. Typically, ninety percent of the corpus is used to train the RNN, and the remaining ten percent are used for testing purposes. The corpus is labeled with words, POS tags and prosodic phrase boundaries. The words are segmented by a word segment system. The word segment system normally includes more then 130 thousand Chinese words. The word segmentation system may utilize a maximal matching method and linguistic rules to segment words.

In addition, a text analysis includes a lexical analysis procedure. A Markov Model may be implemented in the procedure to tag the POS of the words. In fact, some of the lexical analysis may be combined with the word segmentation processing. There are total twenty-six different tags in the POS tag set. However, it may not be necessary and practical to use all of them to train a model. If all of them are utilized, there will be 26*26*26=17576 possible trigrams, at the same time there are only 17897 words in the corpus. In fact if the corpus were big enough, the words themselves may be used to train the model directly. Therefore, in one embodiment, the tags are classified into eleven classes. In one embodiment, the tag classes include adjective, adverb, noun, verb, number, quantifier, preposition, conjunction, idiom, punctuation, and others. As a result, there are total 11*11*11=1331 kind of trigrams, and it is evident that the classification is accurate and effective.

During the training the prosodic phrase boundaries are labeled. Although it is generally a perception that prosodic phrases have some relationship with syntactic phrases, the two are not isomorphic. If all of the prosodic phrase boundaries are labeled manually, there would be too many syntactic phrases in the training corpus. Therefore a set of rules is applied during the prosodic phrase tagging. In one embodiment, the set of rule may include silence (pause), phrase lengthening and pitch declination. The prosodic phrases are extracted from speech for reference. The result of the prosodic phrase may be examined manually by a user through a user interface. In an alternative embodiment, the examination may be conducted by an application through an application programming interface (API).

Figure 6:
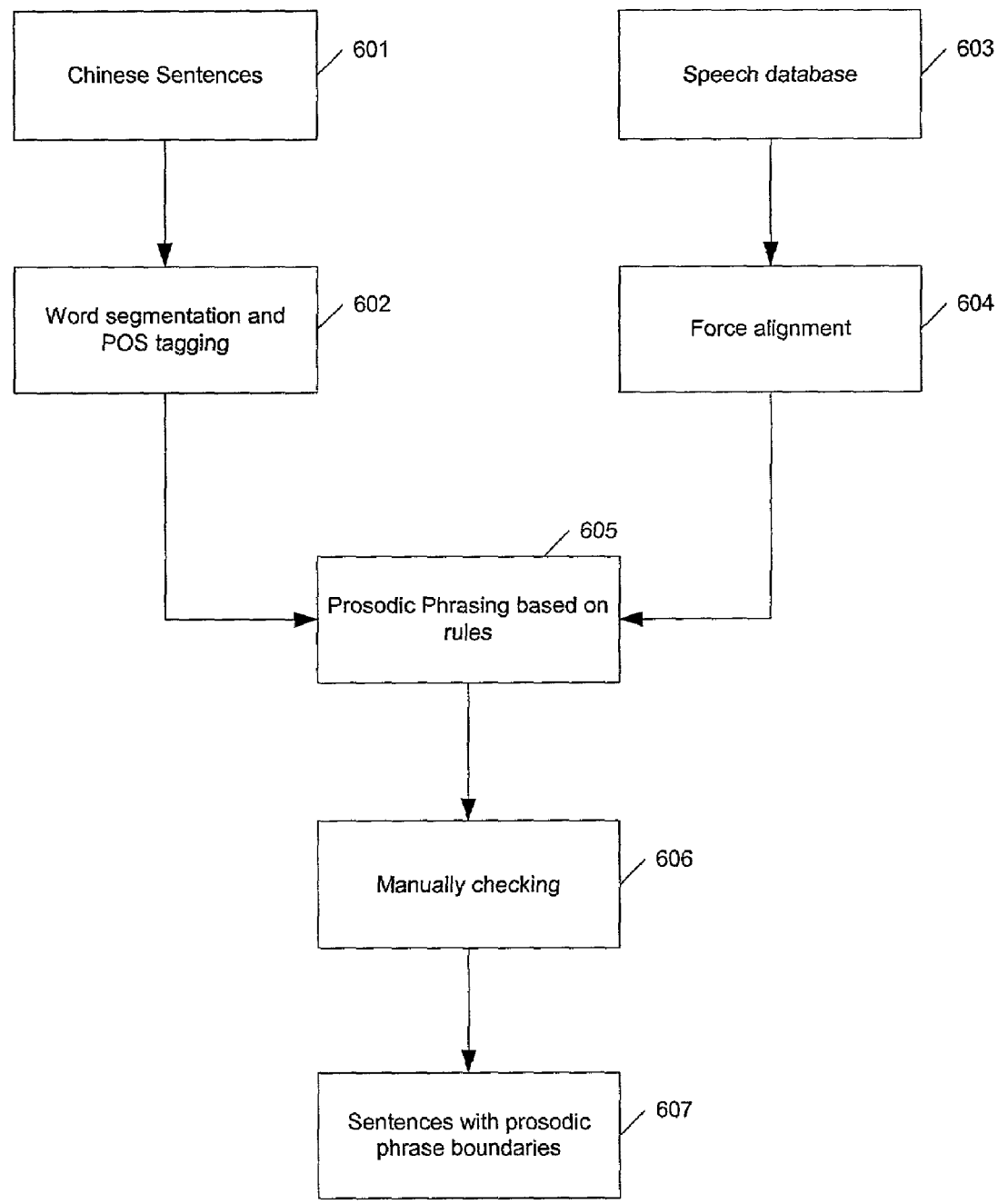
FIG. 6 shows an embodiment of training of an RNN.

FIG. 6 shows an embodiment of training an RNN for detecting a prosodic phrase break in a TTS application. Typically, a variety of text sentences 601 are provided for training. The training system segments the sentences into a plurality of words 602 and assigns each of the plurality of words a part of speech (POS) tag. At the mean while, many words with part of speech are retrieved from the speech database 603 and are aligned into prosodic phrase 604. The speech database 603 may include two major parts: speech and text part. The contents of the speech and the text are the same. Force alignment is normally implemented similar to speech recognition. When the speech and text data are processed through force alignment, the speech data may be marked as one syllable by one syllable. As a result, the syllable features, such as duration, pitch contour, and energy, are available. These features are utilized in a prosodic model to know how the prosodic phrase affects the acoustic features. After the speech data are marked using syllable edges, the syllable length may be calculated. By comparing with the average length the same syllable, a phrase break can be detected.

Then the system performs prosodic phrasing on the plurality of words with POS tags 602 and matches with the prosodic phrases from the speech database 603. The prosodic phrasing processing is typically performed based on a set of rules, such as energy and cross-zero rates, etc. During the processing, the attributes of the objective functions used by the RNN are adjusted. Then the trainer may perform manually checking 606 to ensure the outputs are satisfied. In one embodiment, the checking may be performed through an application programming interface (API) of an application. If the results are not satisfied (e.g., manually checking fails), the attributes of the objective functions are readjusted and more repeating training are conducted until satisfied results are created. As a result, sentences with prosodic phrase break (e.g., phrase boundaries) are generated.

Figure 7:
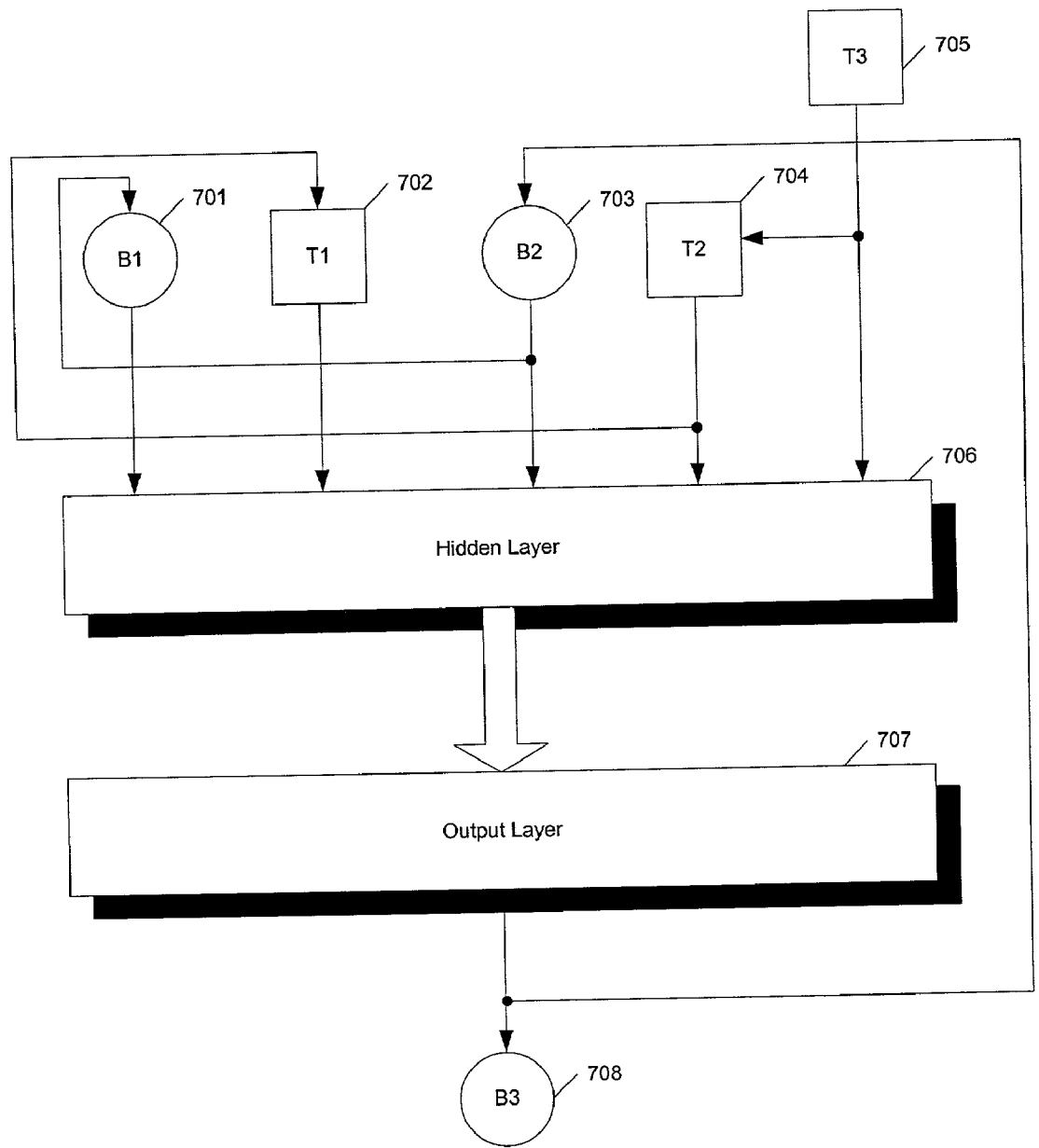
FIG. 7 shows a block diagram of one embodiment.

FIG. 7 shows a block diagram of an RNN according to one embodiment. As described above, a sentence being detected is segmented into a plurality of words, each of the plurality of words associated with a POS tag (e.g., T1 T2 T3 . . . Tn). A purpose of the RNN is to predict whether there is a phrase break between each tag. Referring to FIG. 7, a tag sequence is generated from the words with tags, such as T1 T2 T3 . . . Tn. Initially, initial breaks B1 and B2 is assigned as TRUE, which indicates a break and a punctuation tag (e.g., T1 here) is assigned in front of the tag sequence. T2 and T3 represent the first and second tag of the tag sequence respectively. The RNN will detect whether there is a phrase break (e.g., B3) between tag T2 and T3. Typically, B1, T1, B2, T2, and T3 are inputted to the first to fifth inputs of the RNN respectively. Once all of the inputs (e.g., B1, T1, B2, T2, and T3) are fed into the RNN, the previously trained RNN will generate B3. A value of one indicate B3 is a phrase break and value of zero indicate B3 is not a phrase break.

The inputted POS tags should be orthogonalized into eleven-dimension vectors, thus there is no direct linear relationship among the tags themselves. The break symbols, which represent the state of the break, will be orthogonalized into 2-dimension vectors respectively.

For the subsequent detections, portion of the previous inputted tags and breaks, such as B2, T2, and T3, as well as previously outputted breaks, such as B3, are fed back to the RNN with shifts. For example, the next detection for detecting whether there is a phrase break between tag T3 and the next tag, such as T4 of the tag sequence, will use previously inputs and outputs. In this case, B2, T2, B3, and T3 are inputted to the first, second, third, and fourth inputs of the RNN respectively. The next tag on the tag sequence, such as T4 is retrieved from the tag sequence and inputted to the fifth input of the RNN. As a result, a phrase break B4 is generated from the RNN. A value of one indicates B4 is a phrase break and value of zero indicates B4 is not a phrase break. These processes are repeated until there is no more tag left in the tag sequence.

Figure 8:
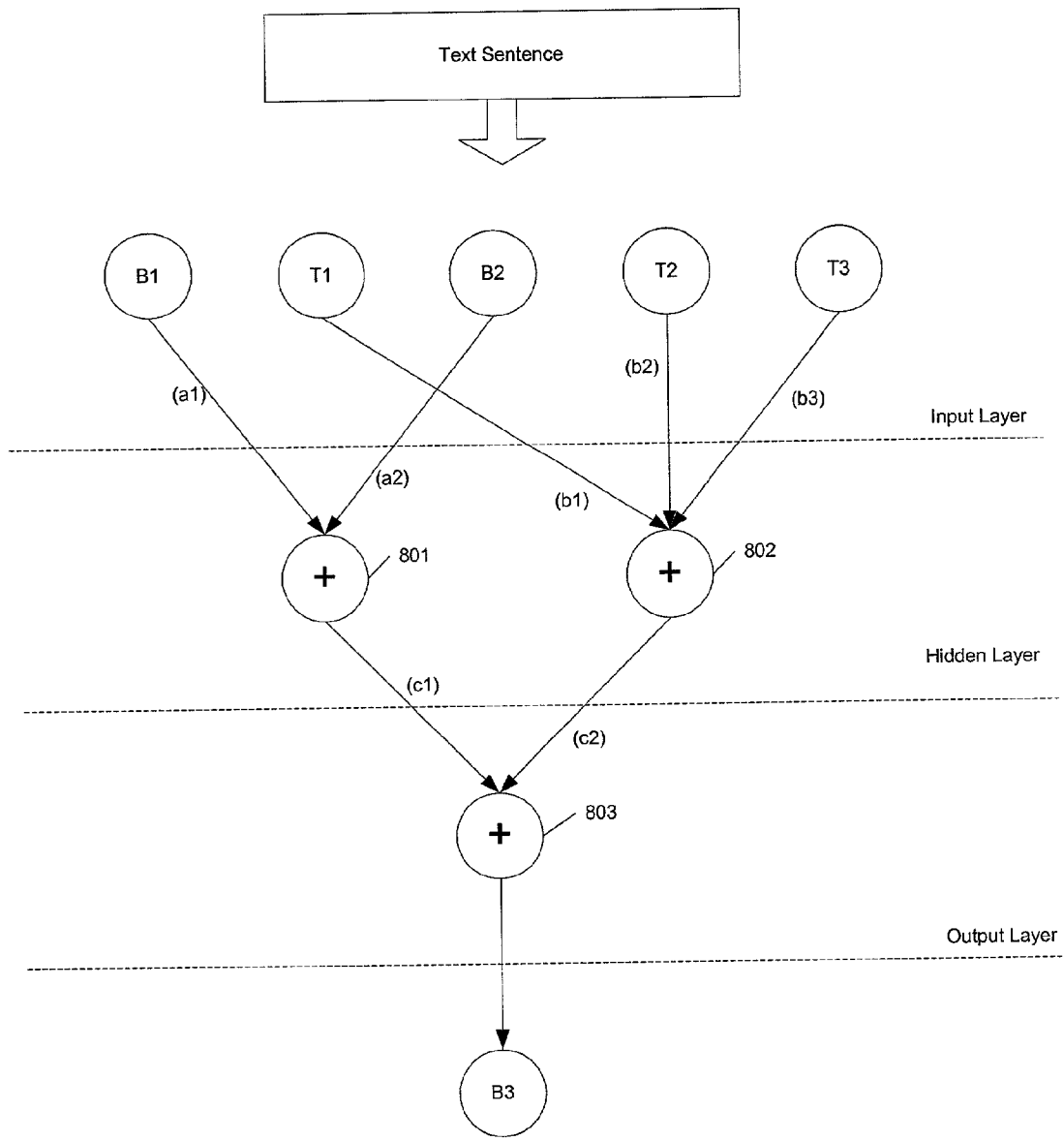
FIG. 8 shows an example of detecting prosodic phrase break through an RNN according to one embodiment.

FIG. 8 shows an embodiment of the RNN processing. Referring to FIG. 8, B1, T1, B2, T2, and T3 are inputted to the first, second, third, fourth, and fifth inputs of the RNN respectively. The computations are performed in the hidden layer. A temporal value 801 may be calculated from B1 and B2 through a set of attributes. In one embodiment, the corresponding objective function, such as 801 of FIG. 8 may be as follows:

$$X = \sum_{i=1}^{2} a_i B_i$$

Wherein i is ranging from 1 to 2. Similarly, a temporal value may be calculated from all inputted tags, such as T1, T2, and T3. In one embodiment, the corresponding objective function, such as 802 of FIG. 8 may be as follows:

$$Y = \sum_{i=1}^{3} \left( \sum_{j=1}^{11} b_{ij} T_{ij} \right)$$

Wherein i is ranging from 1 to 3 and j is ranging from 1 to 11. Since the classification of the tags contains eleven classes, as described above, the inputted tags and the corresponding attribute $b_{ij}$ are eleven dimension vectors. In the output layer, the final output B3 is calculated based on the above-values. In one embodiment, the B3 may be calculated as follows:

$$B3 = c_1 X + c_2 Y$$

The value of B3 indicates whether B3 is a prosodic phrase break. If the value of B3 is greater than a threshold, B3 indicates there is a break. Otherwise, there is no break. In one embodiment, if the value of B3 is greater or equal to 0.5, a prosodic phrase break is observed. Otherwise, it indicates there is no break existed. Before the RNN can be used to detect a phrase break, the attributes of the RNN, such as $a_i$ and $b_{ij}$, as well as $c_1$ and $c_2$ are generated through a repetitive RNN training, as discussed above. The attributes of the RNN are adjusted through the repetitive training until the results are satisfied.

Figure 9:
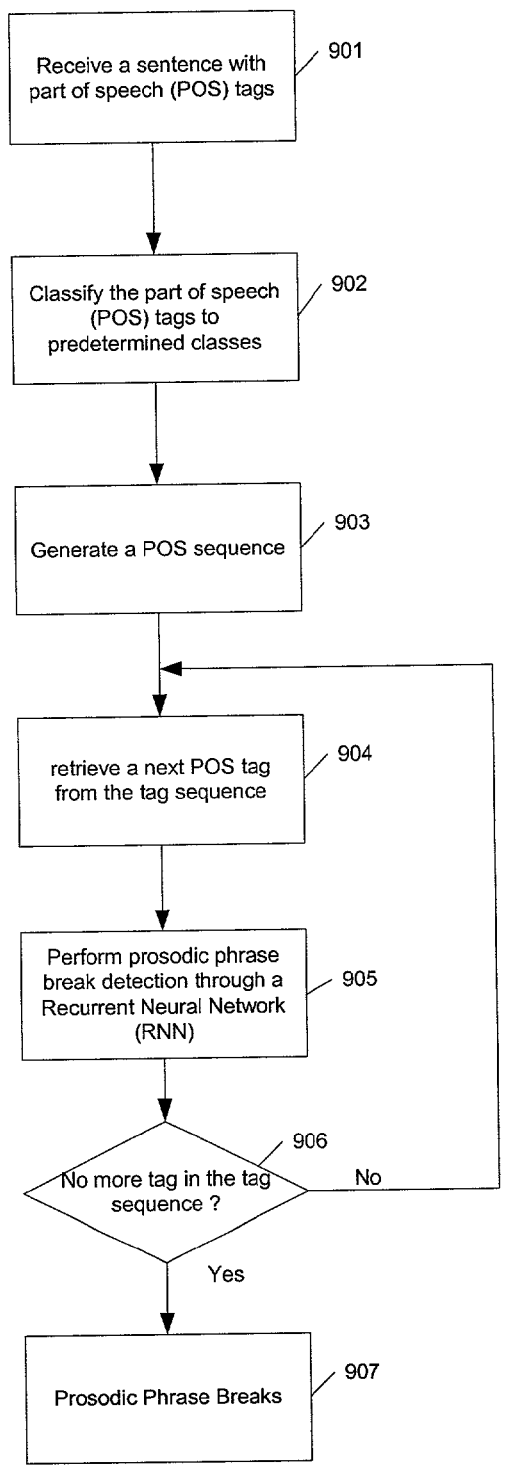
FIG. 9 shows a flowchart for detecting prosodic phrase break in accordance with one embodiment.

FIG. 9 shows a method to detect a prosodic phrase break according to one embodiment. In one embodiment, the method includes receiving a text sentence comprising a plurality of words, each of the plurality of words having a part of speech (POS) tag, generating a POS sequence based on the POS tag of each of the plurality of words, detecting a prosodic phrase break through a recurrent neural network (RNN), based on the POS sequence, and generating a prosodic phrases boundary based on the prosodic phrase break. In an alternative embodiment, the method includes initializing the RNN network, retrieving a POS tag from the tag sequence, inputting the POS tag to the RNN network, generating an output phrase break associated with the POS tag, from the RNN network, retrieving a next POS tag from the tag sequence, and repeating above steps until there are no more POS tags to be processed in the tag sequence.

Referring to FIG. 9, the system receives 901 a sentence with part of speech (POS) tags associated with each word of the sentence. The tags of the words in the sentence are then classified 902 into specific classes. In one embodiment, these classes are among the eleven classes discussed above. Based on the classified tags, a tag sequence is generated 903. The system retrieves 904 a next tag from the tag sequence and inputs to the recurrent neural network (RNN) to detect 905 a prosodic phrase break. As a result, a prosodic break state is generated from the RNN. Then the system checks 906 whether there are more tags in the tag sequence. If there are more tags in the tag sequence, a next tag will be retrieved from the tag sequence and the newly generated break value, as well as other previously inputs and outputs are fed back to the RNN to detect a prosodic break corresponding to the new input. These processing will be repeated until there are no more tags in the tag sequence. As a result, a sentence with prosodic phrase break is created.

Figure 10:
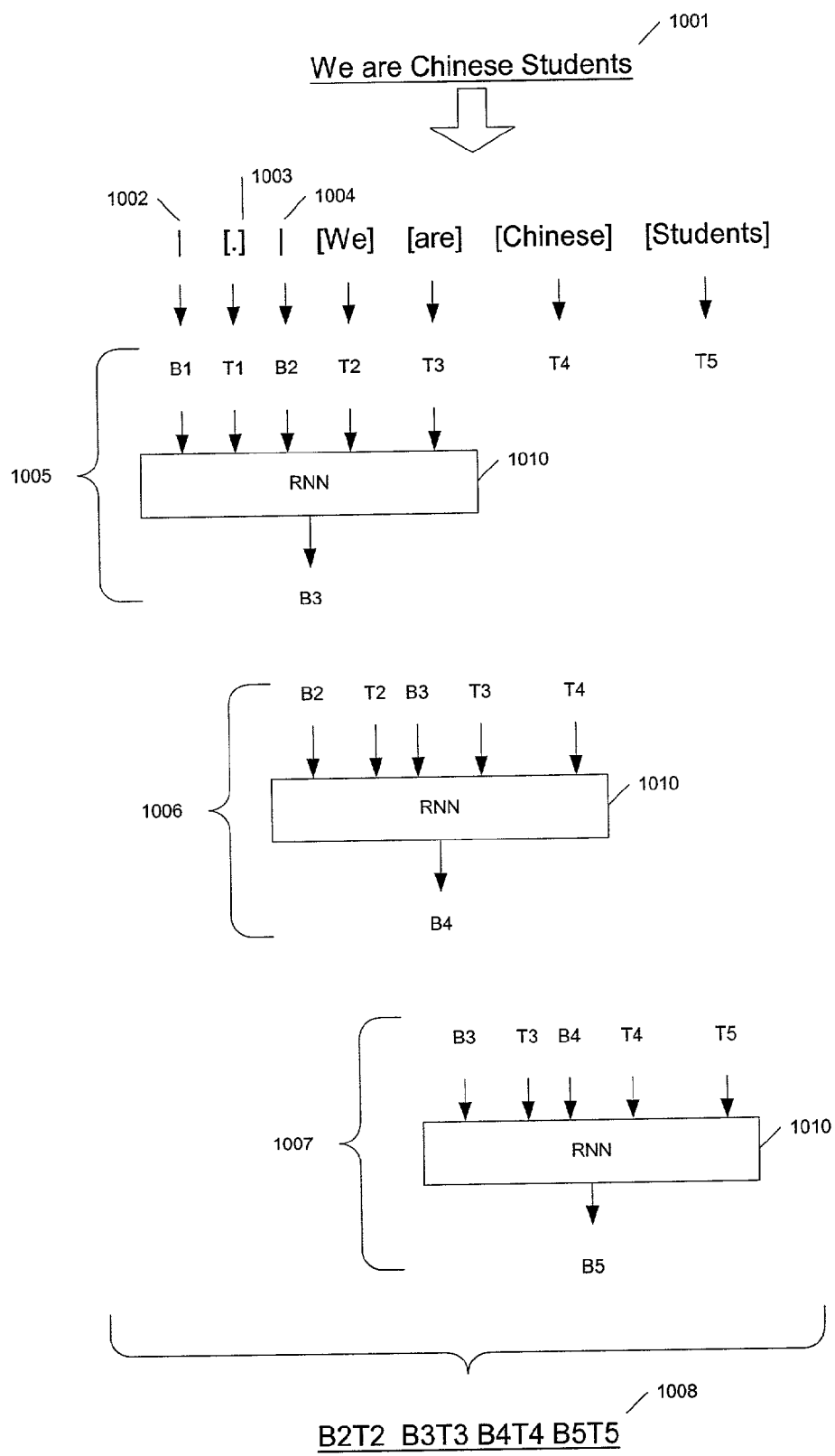
FIG. 10 shows another example of detecting prosodic phrase break through an RNN according to one embodiment.

FIG. 10 shows an example of detecting a prosodic phrase break in a sentence, according to one embodiment. The sentence 1001 of "We are Chinese Students" are segmented into a plurality words, such as "We", "are", "Chinese", and "Students". The purpose of the processing is to detect whether there should be a break between each of the above-words. Each word is then assigned a classified tag. For example, the words "we" may be classified as class of preposition, and words of "Chinese" and "Students" may be classified as class of noun, while the word of "are" may be classified as class of verb. Accordingly, these words are assigned with corresponding tags, such as T2, T3, T4, and T5. Initially, according to one embodiment, a punctuation 1003 is added to the head of the sequence, indicating the starting of the sequence. A punctuation tag T1 is assigned to the punctuation 1003. Two initial breaks 1002 (e.g., B1) and 1004 (e.g., B2) are also added before and after the punctuation tag T1. Then the first and second tags (e.g., T2 and T3) from the sequence, as well as B1, T1, and B2 are inputted to the RNN 1010. During the first operation 1005 of RNN, B3 is generated; a value of one indicates a break and a value of zero indicate no break.

Next, the parameters are shifted. During the second operation 1006 of RNN 1010, B2, T2, T3 and the newly outputted B3 are inputted to RNN 1010. In addition, the next tag from the tag sequence, T4 is also inputted to RNN 1010. As a result, B4 is generated. These processes will be repeated in the operation 1007, with a subsequent tag (e.g., T5), until there is no more tag left in the tag sequence. As a result, a sentence with prosodic phrase break 1008 is generated. This sentence will be processed in a subsequent speech processes.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:

in response to a text sentence comprising a plurality of words, each having a part of speech (POS) tag, generating a POS sequence based on the POS tag of each of the plurality of words;

detecting a prosodic phrase break from an output phrase break through a recurrent neural network (RNN), based on the POS sequence, through iterative operations including retrieving a particular POS tag from the tag sequence, inputting a first phrase break to a first input of the RNN network, inputting a first POS tag from the tag sequence to a second input of the RNN network, wherein the first POS tag is associated with the first phrase break, inputting a second phrase break to a third input of the RNN network, inputting a second POS tag from the tag sequence to a fourth input of the RNN network, wherein the second POS tag is associated with the second phrase break, and wherein the second POS tag is next to the first POS tag in the tag sequence, and inputting the particular POS tag to a fifth input of the RNN network, generating the output phrase break associated with the particular POS tag, from the RNN network, retrieving a next POS tag from the tag sequence, and repeating the above iterative operations until there are no more POS tags to be processed in the tag sequence; and generating a prosodic phrases boundary based on the prosodic phrase break.

2. The method of claim 1, comprising:

assigning a POS tag for each of the plurality of words of the sentence; and classifying the POS tag for each of the plurality of words to a predetermined class.

3. The method of claim 2, wherein the classification of the POS tag comprises adjective, adverb, noun, verb, and number.

4. The method of claim 3, wherein the classification of the POS tag further comprises quantifier, preposition, conjunction, idiom, and punctuation.

5. The method of claim 1, further comprising segmenting the sentence into the plurality of words.

6. The method of claim 1, further comprising:

inputting the second phrase break to the first input of the RNN network;

inputting the second POS tag to the second input of the RNN network;

inputting the output phrase break, previously generated through the RNN network, to the third input of the RNN network;

inputting the particular POS tag to the fourth input of the RNN network;

inputting a next POS tag following the particular POS tag in the tag sequence to the fifth input of the RNN network; and generating a next phrase break associated with the next POS tag through the RNN network.

7. The method of claim 1, wherein the phrase break is generated based on the previously inputted POS tags and previously generated phrase breaks, through the RNN network.

8. A method, comprising:

retrieving a particular part of speech (POS) tag from a tag sequence;

inputting the particular POS tag to an recurrent neural network (RNN) including inputting a first phrase break to a first input of the RNN network, inputting a first POS tag from the tag sequence to a second input of the RNN network, wherein the first POS tag is associated with the first phrase break, inputting a second phrase break to a third input of the RNN network, inputting a second POS tag from the tag sequence to a fourth input of the RNN network, wherein the second POS tag is associated with the second phrase break, and wherein the second POS tag is next to the first POS tag in the tag sequence, and inputting the particular POS tag to a fifth input of the RNN network;

generating an output phrase break associated with the particular POS tag, from the RNN network;

retrieving a next POS tag from the tag sequence; and repeating inputting the particular POS tag, generating an output phrase break, and retrieving a next POS tag, until there are no more POS tags to be processed in the tag sequence.

9. The method of claim 8, further comprising:

inputting the second phrase break to the first input of the RNN network;

inputting the second POS tag to the second input of the RNN network;

inputting the output phrase break, previously generated through the RNN network, to the third input of the RNN network;

inputting the particular POS tag to the fourth input of the RNN network;

inputting a next POS tag following the particular POS tag in the tag sequence to the fifth input of the RNN network; and generating a next phrase break associated with the next POS tag through the RNN network.

10. The method of claim 8, wherein the first phrase break is generated based on the previously inputted POS tags and previously generated phrase breaks, through the RNN network.

11. An apparatus, comprising:

an interface to receive a text sentence comprising a plurality of words, each of the plurality of words having a part of speech (POS) tag;

a text processing unit to generate a POS sequence based on the POS tag of each of the plurality of words;

an recurrent neural network (RNN) to detect a prosodic phrase break from an output phrase break, based on the POS sequence and generating a prosodic phrases boundary based on the prosodic phrase break, wherein the RNN network comprises an input layer for receiving input data, including a first input to receive a first phrase break, a second input to receive a first POS tag from the tag sequence, wherein the first POS tag is associated with the first phrase break, a third input to receive a second phrase break, a fourth input to receive a second POS tag from the tag sequence, wherein the second POS tag is associated with the second phrase break, and a fifth input to receive a third POS tag of the tag sequence, a hidden layer to perform a prosodic phrase break detection, and an output layer to generate the output phrase break; and a speech processing unit to perform speech analysis on the prosodic phrase breaks and generating an output speech based on the prosodic phrase breaks.

12. The apparatus of claim 11, wherein the text processing unit assigns the POS tag for each of the plurality of words of the sentence, and classifies the POS tag for each of the plurality of words to a predetermined class.

13. The apparatus of claim 11, wherein:

the first input receives the second phrase break;

the second input receives the second POS tag;

the third input receives the output phrase break, previously generated;

the fourth input receives the third POS tag; and the fifth input receives a next POS tag following the third POS tag in the tag sequence.

14. The apparatus of claim 11, wherein the first phrase break is generated based on the previously inputted POS tags and previously generated phrase breaks, through the RNN network.

15. A machine-readable medium having stored thereon executable code which causes a machine to perform a method, the method comprising:

in response to a text sentence comprising a plurality of words, each having a part of speech (POS) tag, generating a POS sequence based on the POS tag of each of the plurality of words;

detecting a prosodic phrase break from an output phrase break through a recurrent neural network (RNN), based on the POS sequence, through iterative operations including retrieving a particular POS tag from the tag sequence, inputting the particular POS tag to the RNN network, including inputting a first phrase break to a first input of the RNN network, inputting a first POS tag from the tag sequence to a second input of the RNN network, wherein the first POS tag is associated with the first phrase break, inputting a second phrase break to a third input of the RNN network, inputting a second POS tag from the tag sequence to a fourth input of the RNN network, wherein the second POS tag is associated with the second phrase break, and wherein the second POS tag is next to the first POS tag in the tag sequence, and inputting the particular POS tag to a fifth input of the RNN network, generating the output phrase break associated with the particular POS tag, from the RNN network, retrieving a next POS tag from the tag sequence, and repeating the above iterative operations until there are no more POS tags to be processed in the tag sequence; and generating a prosodic phrases boundary based on the prosodic phrase break.

16. The machine-readable medium of claim 15, wherein the method further comprises:

assigning a POS tag for each of the plurality of words of the sentence; and classifying the POS tag for each of the plurality of words to a predetermined class.

17. The machine-readable medium of claim 15, wherein the method further comprises:

inputting the second phrase break to the first input of the RNN network;

inputting the second POS tag to the second input of the RNN network;

inputting the output phrase break, previously generated through the RNN network, to the third input of the RNN network;

inputting the particular POS tag to the fourth input of the RNN network;

inputting a next POS tag following the particular POS tag in the tag sequence to the fifth input of the RNN network; and generating a next phrase break associated with the next POS tag through the RNN network.

18. A machine-readable medium having stored thereon executable code which causes a machine to perform a method, the method comprising:

retrieving a particular part of speech (POS) tag from a tag sequence;

inputting the particular POS tag to an recurrent neural network (RNN) including inputting a first phrase break to a first input of the RNN network, inputting a first POS tag from the tag sequence to a second input of the RNN network, wherein the first POS tag is associated with the first phrase break, inputting a second phrase break to a third input of the RNN network.

inputting a second POS tag from the tag sequence to a fourth input of the RNN network, wherein the second POS tag is associated with the second phrase break, and wherein the second POS tag is next to the first POS tag in the tag sequence, and inputting the particular POS tag to a fifth input of the RNN network;

generating an output phrase break associated with the POS tag, from the RNN network;

retrieving a next POS tag from the tag sequence; and repeating inputting the particular POS tag, generating an output phrase break, and retrieving a next POS tag, until there are no more POS tags to be processed in the tag sequence.

19. The machine-readable medium of claim 18, wherein the method further comprising:

inputting the second phrase break to the first input of the RNN network;

inputting the second (POS) tag to the second input of the RNN network;

inputting the output phrase break, previously generated through the RNN network, to the third input of the RNN network;

inputting the particular POS tag to the fourth input of the RNN network;

inputting the next POS tag to the fifth input of the RNN network; and generating a next phrase break associated with the next POS tag through the RNN network.

20. The machine-readable medium of claim 18, wherein the first phrase break is generated based on the previously inputted POS tags and previously generated phrase breaks, through the RNN network.

\* \* \* \* \*